United States Patent
Diab et al.

(10) Patent No.: US 9,351,057 B2
(45) Date of Patent: May 24, 2016

(54) SERVICE PROVISIONING ENABLED MANAGEMENT IN SIEPON SWITCHING SUBSYSTEM

(71) Applicant: Broadcom Corporation, Irvine, CA (US)

(72) Inventors: Wael William Diab, San Francisco, CA (US); Ryan Hirth, Windsor, CA (US); Lowell D. Lamb, San Ramon, CA (US); Glen Kramer, Petaluma, CA (US)

(73) Assignee: BROADCOM CORPORATION, Irvine, CA (US)

( * ) Notice: Subject to any disclaimer, the term of this patent is extended or adjusted under 35 U.S.C. 154(b) by 81 days.

(21) Appl. No.: 13/684,512

(22) Filed: Nov. 24, 2012

(65) Prior Publication Data

US 2014/0112657 A1    Apr. 24, 2014

Related U.S. Application Data

(60) Provisional application No. 61/717,683, filed on Oct. 24, 2012.

(51) Int. Cl.
*H04Q 11/00* (2006.01)
*H04L 12/24* (2006.01)
*H04L 12/26* (2006.01)

(52) U.S. Cl.
CPC ........ *H04Q 11/0067* (2013.01); *H04L 41/0833* (2013.01); *H04L 41/5025* (2013.01); *H04L 41/5067* (2013.01); *H04L 43/0852* (2013.01); *Y02B 60/43* (2013.01); *Y02B 60/44* (2013.01)

(58) Field of Classification Search
USPC ................................................. 398/66, 167.5
See application file for complete search history.

(56) References Cited

U.S. PATENT DOCUMENTS

| 2002/0181044 | A1* | 12/2002 | Kuykendall, Jr. ............. 359/124 |
| 2012/0063780 | A1* | 3/2012 | Greenberg et al. ............. 398/58 |
| 2013/0022356 | A1* | 1/2013 | Ghazisaidi ....................... 398/66 |

OTHER PUBLICATIONS

IEEE P1904.1™/D3.0 Draft Standard for Service Interoperability in Ethernet Passive Optical Networks (SIEPON), Aug. 2012.
Michael J. Bennett and Lowell D. Lamb, "Energy Efficiency in IEEE Ethernet Networks—Current Status and Prospects for the Future," Sep. 22, 2012.

\* cited by examiner

*Primary Examiner* — Nathan Curs
(74) *Attorney, Agent, or Firm* — Foley & Lardner LLP; Joseph N. Ziebert; Angela D. Murch

(57) ABSTRACT

A service provisioning enabled management in Service Interoperability in Ethernet Passive Optical Network (SIEPON) switching subsystem. The delivery of network services to each of a plurality of subscribers coupled to an optical network unit (ONU) can be defined individually by the service provider. The service-specific functions within the ONU can be configured based on knowledge of the levels of provisioning of network services.

25 Claims, 5 Drawing Sheets

SERVICE PROVISIONING ENABLED MANAGEMENT IN SIEPON SWITCHING SUBSYSTEM

This application claims priority to provisional application No. 61/717,683, filed Oct. 24, 2012, which is incorporated herein by reference in its entirety.

BACKGROUND

1. Field of the Invention

The present invention relates generally to networks and, more particularly, to the service provisioning enabled management in Service Interoperability in Ethernet Passive Optical Network (SIEPON) switching subsystem.

2. Introduction

Energy costs continue to escalate in a trend that has accelerated in recent years. Such being the case, various industries have become increasingly sensitive to the impact of those rising costs. One area that has drawn increasing scrutiny is the IT infrastructure. Many companies are now looking at their IT systems' power usage to determine whether the energy costs can be reduced. For this reason, an industry focus on energy efficient networks (IEEE 802.3az) has arisen to address the rising costs of IT equipment usage as a whole (i.e., PCs, displays, printers, switches, servers, network equipment, etc.).

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

In a point-to-multipoint system such as an Ethernet passive optical network (EPON), a single optical line terminal (OLT) at a head end can be designed to communicate with a plurality of optical network units (ONUs) at various end nodes. The ONUs, which can also be referred to as customer nodes, can be combined with other service-specific functions. For example, the ONU can also be designed to include a control CPU, a media converter, customer premises equipment, a switch (e.g., for multiple dwelling unit (MDU) or small-medium business (SMB) type ONUs), a gateway, or the like, which are configured to perform various service-specific functions in delivering network services to one or more subscribers.

In an example of an ONU configured for operation in an MDU environment, the delivery of network services to each of the plurality of subscribers can be defined individually by the service provider. In this context, provisioning of network services to the plurality of subscribers can be governed by quality of service (QoS) or service level agreements (SLAs). In one example, the SIEPON protocol can be used to manage the operation, administration and maintenance of the delivery of network services to the plurality of subscribers.

In the present invention, it is recognized that the service-specific functions within the ONU can be configured based on knowledge of the levels of provisioning of network services. For example, in an MDU environment, the ONU can include a switching subsystem that includes a plurality of subscriber ports, which are each provisioned to deliver network services based on particularly-defined levels of provisioned service (e.g., bandwidth, latency, traffic class priority, etc.). In one embodiment, the determined level of provisioning from the access portion of the ONU can be used to configure an operation of the switching subsystem (e.g., frequency of operation, module deactivation, energy efficiency control policy operation, buffering, etc.) or other service-specific function operating on the network side of the ONU.

Figure 1:
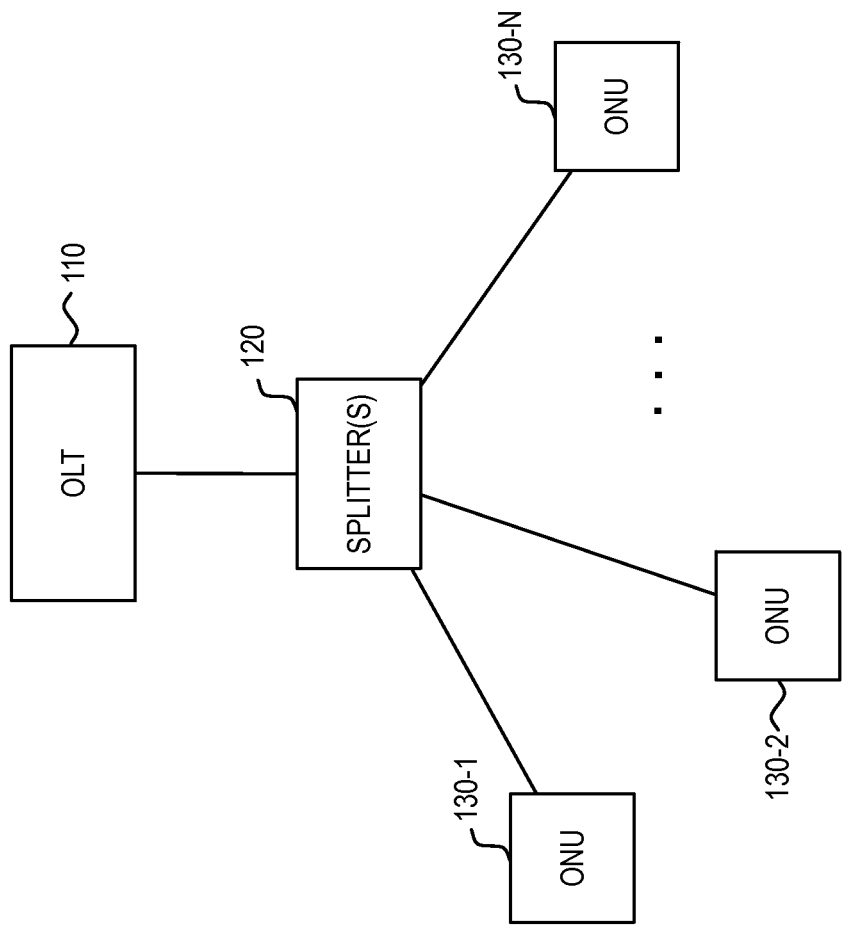
FIG. 1 illustrates an example of a point-to-multipoint communication network.

FIG. 1 illustrates an example of a point-to-multipoint communication network. As illustrated, the point-to-multipoint network includes a single OLT 110 that communicates with a plurality of ONUs 130-$n$ via a PON. The illustrated PON includes splitter(s) 120, which enable a single feeder cable to be split into multiple drop cables for the individual ONUs 130-$n$. Each ONU 130-$n$ can interface with a non-PON domain such as that supported by further coaxial cable, copper twisted pair, fiber optic media, wireless, etc. network links.

Here, it should be noted that the PON domain can represent an EPON such as that defined by IEEE 802.3, GPON, BPON, xGPON, or NGPON defined by ITU-T, BIPON, or the like. In general, the advantage of the PON is that it allows sharing of the fiber optic plant by multiple network nodes. In the downstream direction, OLT 110 is configured to broadcast frames containing packets to the ONUs that are responsible for extracting the particular packets that are destined for that location, while in the upstream direction the ONUs are designed to transmit in a way to avoid collisions between the packets using, for example, a time division multiple access (TDMA) communication protocol. Here, it should be noted that the PON domain can also be based on coaxial cabling such as that provided by EPON over Coax (EPoC) systems.

Figure 2:
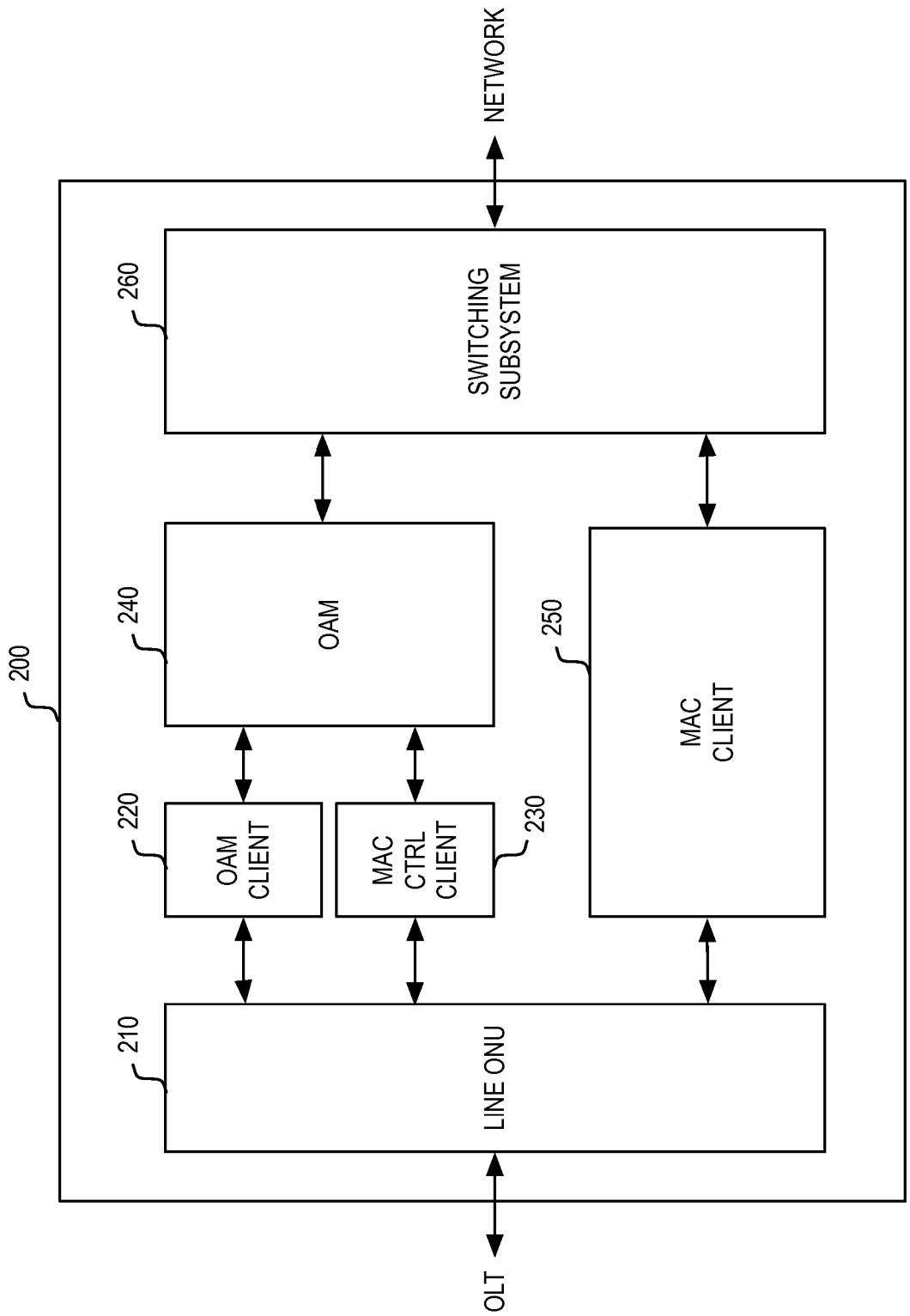
FIG. 2 illustrates an example of an optical network unit including an energy efficiency control system.

FIG. 2 illustrates an example of an ONU including a switching subsystem as part of its service-specific function. As illustrated, ONU 200 includes Line ONU 210. In one example applied to IEEE 802. EPON, Line ONU 210 includes a physical layer device (PHY), PON media access control (MAC), and extended PON protocols, which further includes a lower layer Multi-Point Control Protocol (MPCP) and a higher layer Operation, Administration and Maintenance (OAM). In another example applied to ITU-T GPON, the extended PON protocols includes a lower layer Physical Layer Operations and Maintenance (PLOAM) and a higher layer Operation Management Control Interface (OMCI). In general, the extended PON protocols in ONU 200 is designed to cooperate with corresponding extended PON protocols in the OLT in providing end-to-end services.

As illustrated OAM 240 interacts with Line ONU 210 via OAM client 220 and MAC Control Client 230. In general, OAM 240 can facilitate discovery and registration, GATE processing, and REPORT generation via MAC Control Client 230, and can facilitate alarms, statistics, provisioning, authentication, Internet Group Management Protocol (IGMP)/Multicast Listener Discovery (MLD), Simple Network Management Protocol (SNMP), power saving and protection via OAM Client 220.

Finally, MAC Client 250 facilitates data services from Line ONU 210 to a non-PON domain represented by switching subsystem 260. As illustrated, switching subsystem 260 facilitates a connection of ONU 200 to a client-facing network. In one application (e.g., MDU/SMB), the client-facing network can include a plurality of network interfaces that are designed to support a plurality of subscriber connections. Switching subsystem 260 can then be configured to distribute traffic received from the access interface supported by Line ONU 210 to the plurality of network interfaces, and aggregate traffic from the plurality of network interfaces for delivery to the access interface supported by Line ONU 210.

In the present invention, it is recognized that the knowledge of the provisioning levels of the traffic traversing ONU 200 can be used to configure the operation of switching subsystem 260. This is in contrast to a switch that operates in isolation, and is therefore reliant on monitoring of traffic or activity within the switch to detect or infer service levels of upstream/downstream network elements. For example, an energy efficiency control policy that is designed to control energy savings produced within the switch is typically based on a monitoring of dynamic traffic flow in the ports of the switch.

Figure 3:
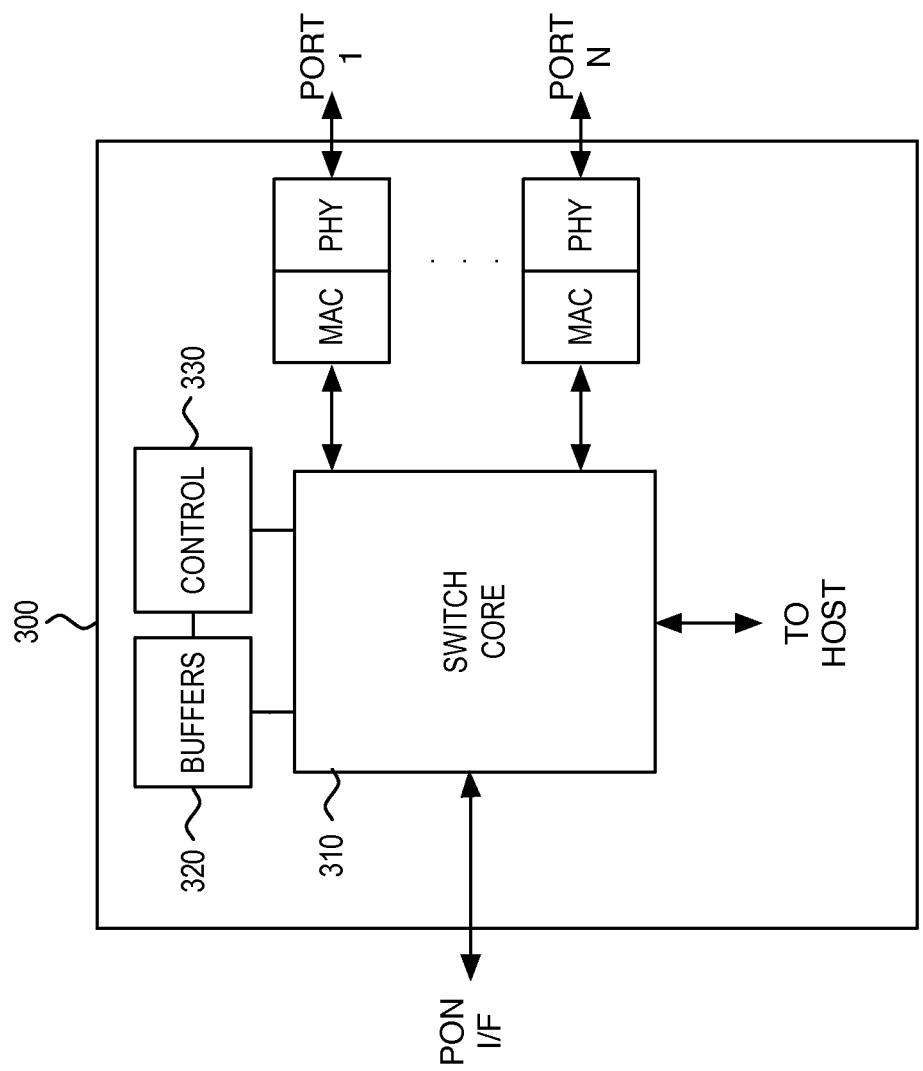
FIG. 3 illustrates an example of a switching subsystem contained within an optical network unit.

Prior to describing a mechanism for configuring an operation of a switching subsystem within an ONU based on provisioned levels of service, reference is first made to FIG. 3, which illustrates an example embodiment of a switching subsystem. In general, switching subsystem 300 can represent any module or collection of modules that incorporate multi-port switch functionality. As illustrated, switching subsystem 300 includes switch core 310 that facilitates interconnection between a host connection (e.g., internal port), a PON-domain interface, and a plurality of network-facing subscriber ports 1-N. As illustrated, each of the plurality of subscriber ports 1-N can include MAC and PHY interfaces. Switching subsystem 300 is also supported by buffers 320 and control 330.

In one embodiment, switching subsystem 300 can also include an energy efficiency control policy that is designed to produce energy savings. As noted, an energy efficiency control policy can attempt to save power when the traffic utilization through the switching subsystem is not at its maximum capacity. Here, an energy efficiency control protocol can be used to minimize a transmission performance impact while maximizing energy savings. At a broad level, the energy efficiency control policy can be designed to determine when to enter an energy saving state, what energy saving state (i.e., level of energy savings) to enter, how long to remain in that energy saving state, what energy saving state to transition to out of the previous energy saving state, etc.

Figure 4:
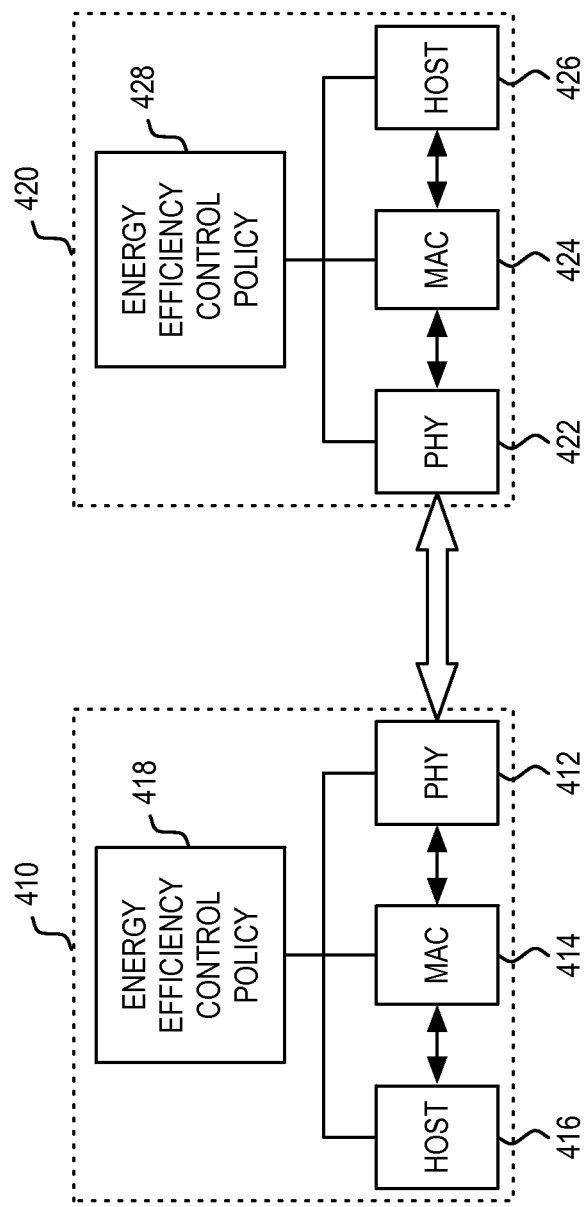
FIG. 4 illustrates an example link using energy efficiency control systems.

FIG. 4 illustrates an example link that includes an energy efficiency control policy. As illustrated, the link supports communication between a first link partner 410 and a second link partner 420. In one embodiment, link partner 410 can represent the switching subsystem, while link partner 420 can represent a subscriber device. As illustrated, link partner 410 includes PHY 412, MAC 414, and host 416, while link partner 420 includes PHY 422, MAC 424, and host 426.

In general, hosts 416 and 426 may comprise suitable logic, circuitry, and/or code that may enable operability and/or functionality of the five highest functional layers for data packets that are to be transmitted over the link. Since each layer in the OSI model provides a service to the immediately higher interfacing layer, MAC controllers 414 and 424 may provide the necessary services to hosts 416 and 426 to ensure that packets are suitably formatted and communicated to PHYs 412 and 422, respectively. MAC controllers 414 and 424 may comprise suitable logic, circuitry, and/or code that may enable handling of data link layer (Layer 2) operability and/or functionality. MAC controllers 414 and 424 can be configured to implement Ethernet protocols, such as those based on the IEEE 802.3 standard, for example. PHYs 412 and 422 can be configured to handle physical layer requirements, which include, but are not limited to, packetization, data transfer and serialization/deserialization (SERDES).

As FIG. 4 further illustrates, link partners 410 and 420 also include energy efficiency control policy entities 418 and 428, respectively. In general, energy efficiency control policy entities 418 and 428 can be designed to determine when to enter an energy saving state, what energy saving state (i.e., level of energy savings) to enter, how long to remain in that energy saving state, what energy saving state to transition to out of the previous energy saving state, etc.

In general, energy efficiency control policy entities 418 and 428 can comprise suitable logic, circuitry, and/or code that may be enabled to establish and/or implement an energy efficiency control policy for the network device. In various embodiments, energy efficiency control policy entities 418 and 428 can be a logical and/or functional block which may, for example, be implemented in one or more layers, including portions of the PHY or enhanced PHY, MAC, switch, controller, or other subsystems in the host, thereby enabling energy-efficiency control at one or more layers.

In one example, energy efficient Ethernet such as that defined by IEEE 802.3az can provide substantial energy savings through the use of a low power idle mode and/or subrating. In general, the low power idle mode can be entered when a transmitter enters a period of silence when there is no data to be sent. Power is thereby saved when the link is off. Refresh signals can be sent periodically to enable wake up from the sleep mode.

Subrating can be used to reduce the link rate to a sub-rate of the main rate, thereby enabling a reduction in power. In one example, this sub-rate can be a zero rate, which produces maximum power savings.

One example of subrating is through the use of a subset PHY technique. In this subset PHY technique, a low link utilization period can be accommodated by transitioning the PHY to a lower link rate that is enabled by a subset of the parent PHY. In one embodiment, the subset PHY technique is enabled by turning off portions of the parent PHY to enable operation at a lower or subset rate (e.g., turning off three of four channels). In another embodiment, the subset PHY technique can be enabled by slowing down the clock rate of a parent PHY. For example, a parent PHY having an enhanced core that can be slowed down and sped up by a frequency multiple can be slowed down by a factor of 10 during low link utilization, then sped up by a factor of 10 when a burst of data is received. In this example of a factor of 10, a 10 G enhanced core can be transitioned down to a 1 G link rate when idle, and sped back up to a 10 G link rate when data is to be transmitted.

In general, both the subrating and low power idle techniques involve turning off or otherwise modifying portions of the PHY during a period of low link utilization. As in the PHY, power savings in the higher layers (e.g., MAC) can also be achieved by using various forms of subrating as well. In general, the energy efficiency control policy can be designed to configure or otherwise modify the operation of a link partner to enable efficient operation of the link partner in accommodating network traffic.

In the present invention, it is recognized that the configuration of the switching subsystem can benefit from knowledge of the provisioned levels of service that are delivered to one or more subscribers that are coupled to the ONU. This knowledge of the provisioned levels of service can be used to adjust the operation of the switching subsystem. For example, the knowledge of the provisioned levels of service can be used to adjust the power management rules and resource tuning of the switching subsystem.

To illustrate the features of the present invention, consider an example of an ONU in an MDU environment (e.g., office building) that includes a 24-port 10 G switch. In this example, the access link in the upstream direction can be provisioned to run at a maximum of 1 G with only half of the switching subsystem ports being coupled to subscribers having separate and independents SLAs (e.g., different business subscribers). Here, each of the subscriber ports that are connected to customers can have a provisioned service level that provides for a dedicated 100M line upstream. In this example scenario, the bulk of the switching would be designed to aggregate the traffic from the 12 business subscribers upstream, which aggregation will not exceed 1.2 G in the upstream direction. A similar level of provisioning can also be defined for the downstream direction.

With this level of provisioning, the overall capacity of the 24×10 G full-duplex switch would not be reached. More significantly, the switch would be running at about only 5% of its capacity. Where the switch can only attempt to infer the level of service in neighboring devices, the switch would not be aware of the service limitations imposed. The switch would then need to assume that its full switching capacity may be utilized. This leads to significant inefficiencies as the switch would be running at full capacity during an active state even though the majority of its capacity would never be used under the current level of provisioning.

If, on the other hand, the switch had knowledge of the defined provisioned levels of service that showed that only about 5% of its capacity could be utilized, the switch could then choose to adjust its operation to match the network need. Significant improvements in efficiency can therefore result. For example, the switch could choose to lower its frequency of operation, disable one or more modules within the switch, or make other adjustments that would effectively reduce the switch's processing capacity to a level that would be commensurate with the current provisioned levels of service.

As would be appreciated, changes in provisioning of the switch can occur over time. For example, as more subscribers are brought online, the number of provisioned ports would increase along with the aggregate level of traffic flowing through the switch. By leveraging the knowledge of the actual provisioned levels of service, the switch can adjust its configuration/operation to accommodate established provisioning. Again, this mechanism would not be dependent on inferences that are made from actual traffic observed. Rather, this mechanism is based on OAM-information that is made available through the access portion of the ONU.

In one embodiment, the resource management control effected by the switching subsystem is performed by an energy efficiency control policy. As noted above, an energy efficiency control policy can be designed to monitor dynamic traffic flow to identify low link utilization conditions. This monitoring can enable the energy efficiency control policy to leverage energy saving states during periods of low-link utilization. In addition to this dynamic traffic monitoring, the energy efficiency control policy can also leverage the provisioning information that is made available to the energy efficiency control policy by the OAM module in the access portion of the ONU. Significantly, this provisioning information enables the energy efficiency control policy to identify traffic limitations that can lead to power management and resource tuning within the switching subsystem. As would be appreciated, this mechanism would be in addition to the adjustments made through monitoring of dynamic traffic flow by the energy efficiency control policy. In other words, the adjustments based on dynamic monitoring would relate to usage variations within a known provisioned framework.

Figure 5:
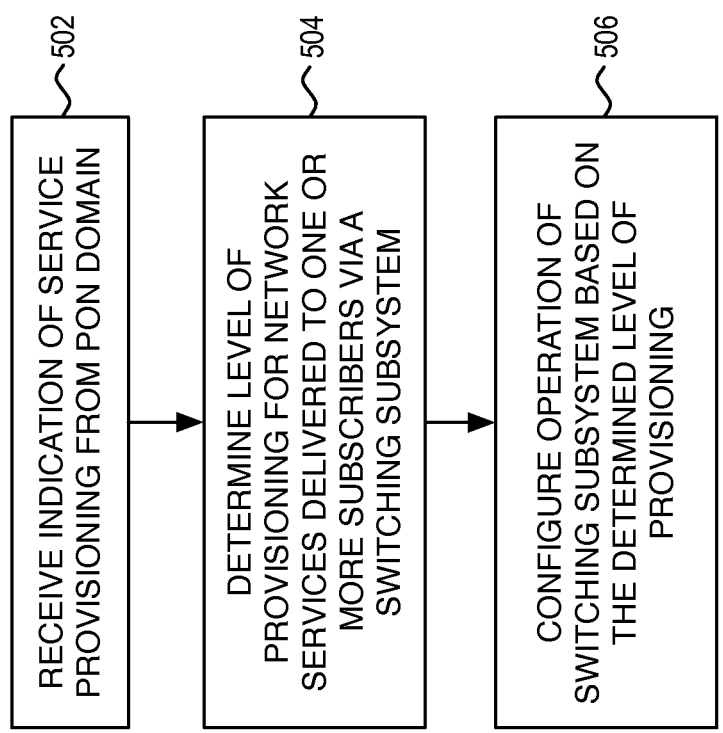
FIG. 5 illustrates an example of a process of the present invention.

Having described a general framework of operation of a switching subsystem within an ONU, reference is now made to FIG. 5, which illustrates a flowchart of a process of the present invention. As illustrated, the process begins at step 502 where an indication of service provisioning (e.g., QoS/SLA) is received from the PON domain. In one embodiment, the indication of service provisioning is received by an energy efficiency control policy from an OAM module in the PON domain. As would be appreciated, the particular mechanism of delivery of the service provisioning indication is implementation dependent. For example, the information may be communicated directly, stored in an accessible memory or profile device, or otherwise made available to the energy efficiency control policy. In one embodiment, the service provisioning indication can be received during service initiation/configuration or during the active operation of the access link.

Based on the received service provisioning indication, a determination of the level of provisioning of network services delivered to one or more subscribers can then be determined at step 504. In various examples, the determination can be a measure of bandwidth, latency, etc. for one or more traffic classes. In general, the determination can be designed to develop an understanding of a framework of provisioning that can be used to tailor the operation of the switching subsystem. For example, a determination of provisioned bandwidth can lead to an understanding of a maximum level of throughput through the switching subsystem. In another example, a determination of provisioned latency guarantees can lead to an adjustment of the wake-up time periods for low power states used by the energy efficiency control policy.

After the determination of the level of provisioning has been performed, the operation of the switching subsystem can then be configured at step 506 based on the determination. As would be appreciated, the particular type of configuration would be dependent on the particular measure of provisioning being utilized. Here, it is recognized that the determination of the level of provisioning provides an overriding framework by which the switching subsystem can know of the needs of the neighboring network devices. This knowledge enables a tailoring of operation without inference or speculation.

Here, it should be noted that the process illustrated in the flowchart of FIG. 5 can be performed whenever a change in provisioning occurs. For example, the process can be performed when a new port is provisioned or when the provisioning on an existing port has been changed (e.g., change in bandwidth). Advantageously, the principles of the present invention enable a service provider to scale the operation of an ONU with the rate of deployment.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method, comprising:
   receiving, by a switching subsystem in an optical network unit, an indication of a defined provisioning level, wherein the indication is received in a communication separate from monitored network traffic flow and the defined provisioning level represents an agreement for providing network services from an optical line terminal to one or more subscriber ports, wherein the subscriber ports are network interfaces within said switching subsystem;
   controlling transitions by physical layer devices in one or more of said network interfaces within said switching subsystem between an active state and an energy saving state based on said received indication of said defined provisioning level; and
   delivering, by said optical network unit, said network services to said subscriber ports.

2. The method of claim 1, wherein said defined provisioning level comprises a bandwidth.

3. The method of claim 1, wherein said defined provisioning level comprises a level of latency.

4. The method of claim 1, wherein said defined provisioning level comprises a quality of service for a type of traffic.

5. The method of claim 1, further comprising configuring a frequency of operation of said switching subsystem responsive to said received indication of said defined provisioning level.

6. The method of claim 1, wherein controlling comprises configuring an energy efficiency control policy that is configured to control energy savings of physical layer devices in one or more of said network interfaces within said switching subsystem.

7. The method of claim 1, wherein said controlling comprises configuring a wake-up time period for a low power state for physical layer devices in one or more of said plurality of network interfaces within said switching subsystem.

8. The method of claim 1, further comprising configuring an amount of buffering used by said switching subsystem responsive to said received indication of said defined provisioning level.

9. A method, comprising:
   determining, by an optical network unit, a configuration of a switching subsystem of said optical network unit responsive to information received from an optical line terminal, the received information indicating a provisioning level of network services to be delivered by optical line terminal to subscriber ports of said switching subsystem, wherein determining the configuration comprises determining a percentage of an available switching capacity of the switching subsystem commensurate with the provisioning level of network services;
   controlling transitions by physical layer devices in one or more of said subscriber ports within said switching subsystem between an active state and an energy saving state according to said determined configuration; and
   delivering, by said optical network unit, said network services to said subscriber ports.

10. The method of claim 9, wherein said provisioning level represents a quality of service or a service level agreement.

11. The method of claim 9, wherein said provisioning level comprises a bandwidth.

12. The method of claim 9, wherein said provisioning level comprises a latency.

13. The method of claim 9, wherein said provisioning level comprises a quality of service for a type of traffic.

14. The method of claim 9, wherein said configuration comprises a frequency of operation of said switching subsystem.

15. The method of claim 9, wherein said subscriber ports are network interfaces of said switching subsystem, and wherein controlling comprises configuring an energy efficiency control policy of said switching subsystem.

16. The method of claim 9, wherein said configuration comprises configuring a wake-up time period for a low power state for a portion of said switching subsystem.

17. The method of claim 9, wherein said configuration comprises configuring an amount of buffering used by said switching subsystem.

18. A network unit, comprising:
   an access interface coupled to a line terminal via a point-to-multipoint cable distribution system;
   a plurality of network interfaces, wherein ones of said network interfaces are configured for use as subscriber ports;
   a switching subsystem configured to deliver traffic received on said access interface to said subscriber ports, said delivery of traffic performed in accordance with a configured operation of said switching subsystem, wherein said configured operation reduces energy usage in said switching subsystem; and
   a controller designed to establish said configured operation of said switching subsystem responsive to an indication of a defined provisioning level for traffic to be delivered to said subscriber ports, the indication received in a communication separate from the traffic to be delivered.

19. The network unit of claim 18, wherein said point-to-multipoint cable distribution system is an optical fiber cable network.

20. The network unit of claim 18, wherein said point-to-multipoint cable distribution system is a coaxial cable network.

21. A method, comprising:
   receiving, by an optical network unit, an indication of a defined provisioning level of network services to be delivered by an optical line terminal to subscriber ports of a switching subsystem of the optical network unit;
   determining a percentage of a total capacity of the switching subsystem sufficient to provide network services according to said provisioning level;
   configuring the switching subsystem according to the determined percentage; and
   controlling transitions of physical layer devices in one or more of said subscriber ports within said switching subsystem between an active state and an energy saving state.

22. The method of claim 21, wherein configuring comprises configuring the switching system to perform at less than a full capacity.

23. The method of claim 21, wherein the energy saving state is operation at a reduced frequency.

24. The method of claim 21, wherein the energy saving state is an inactive state.

25. The method of claim 21, wherein the energy saving state is operation with reduced buffering.

* * * * *